UNITED STATES PATENT OFFICE.

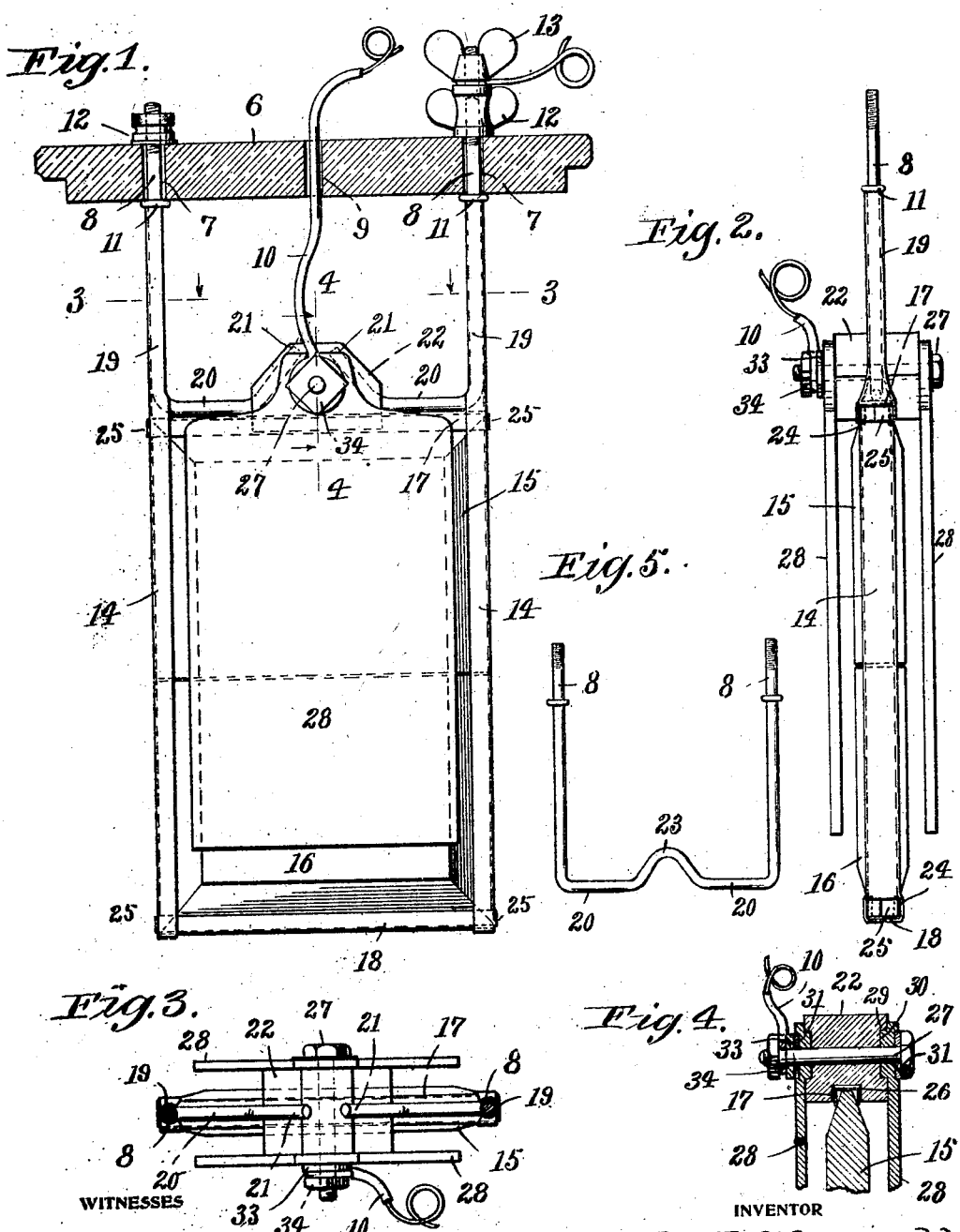

CHARLES B. SCHOENMEHL, OF WATERBURY, CONNECTICUT.

BATTERY-ELECTRODE SUPPORT.

No. 922,727.     Specification of Letters Patent.     Patented May 25, 1909.

Application filed June 10, 1908. Serial No. 437,614.

*To all whom it may concern:*

Be it known that I, CHARLES B. SCHOEN-MEHL, a citizen of the United States, and resident of Waterbury, in the county of New Haven and State of Connecticut, have invented certain new and useful Improvements in Battery-Electrode Supports, of which the following is a specification.

This invention refers to primary batteries such as employ copper oxid and zinc electrodes as their principal elements, with the said copper oxid formed into plates from finely ground oxid of copper molded, pressed and baked to required size, shape and degree of hardness.

The invention further relates to means for supporting both the plate and zinc electrodes within a battery jar and in a simple, practical and convenient way from a battery cover by a pair of nuts which can be readily attached or detached; further to include means for suspending the zinc from the plate holder, adjacent to but properly spaced from the plates whereby the device is made highly efficient, and convenient of attachment to, or removal from a battery cover; and finally to provide means for engaging the edges only of the negative electrode thus leaving the entire sides exposed for action.

To this end the invention resides and consists in the features and arrangement of construction shown upon the accompanying drawings forming a part of this specification upon which similar characters of reference denote like or corresponding parts throughout the several figures and of which, Figure 1, shows a side elevation of my improved support suspended from a battery cover and with both primary battery electrodes supported therein. Fig. 2, is an edge view of the support and electrode shown in Fig. 1. Fig. 3, is a sectional plan view of the support and parts carried thereon taken on line 3—3 of Fig. 1. Fig. 4, is a central vertical longitudinal section through a portion of upper plate, supporting frame and attached zincs, taken on line 4—4 of Fig. 1, and Fig. 5, is a detached plan view of a slightly modified form of top part of supporting frame.

My support consists of a suitable channel frame formed of sheet metal cut and shaped to receive the edges of the plates in a neat and compact manner and having connected rods for supporting the device from a cover, within a jar, and also includes means for insulatingly attaching the zincs to the frame and plates so as to removably support the two elements from the two rods by means of nuts as shown.

In detail 6 represents a suitable porcelain cover for a battery jar, which may be any one of a number of popular designs to be found upon the market, and is provided with holes 7—7 on either side to receive supporting rods 8—8 and an intermediate hole 9 through which a wire 10 passes. The two supporting rods are provided with annular shoulders 11 which in practice engage the underside of the cover surrounding the aforesaid holes 7 while nuts 12 threadably engage the upper ends of the rods to form a detachable connection of the rods to the cover, and whereby the plate support is suspended. One of these rods 8 may be provided with an extra nut 13 and thus serve as a binding nut for a wire to the negative side of battery.

14—14 represents a pair of vertically disposed sheet metal channel frames for engaging and supporting the opposite side edges of the plates 15 and 16, and 17 and 18 similar sheet metal channel cross pieces, one to cover the top edge of the upper plate 15 while the other similarly incloses the under edge of the lower plate 16. The upper portions 19 of the side frames 14 are turned in around the vertically disposed portions of the supporting rods 8—8 to form a rigid connection of one to the other. These rods 8 may be formed separately as seen in Figs. 2 and 3, wherein their lower portions 20 are turned in at a right angle against the top frame piece 17 and with their extremities 21 deflected up to engage the upper opposite side portions of the insulating block 22 as shown, or said rods may be formed in a single piece as seen in Fig. 5, wherein the intermediate portions are connected and bowed up as at 23 to span and engage the said block. This construction obviously serves to insure the latter retaining their proper position spaced from the plates.

In practice the horizontal cross pieces of the frame are preferably secured to the vertical side member by forming slots 24 therein and then projecting the end portions 25 of the cross pieces therethrough and turning the same over upon such sides as shown in Figs. 1 and 2.

A porcelain block 22 as before referred to, is used to insulatively secure the zincs to the frame and is of a suitable shape and form to accommodate the several connecting parts. It contains a transverse groove 26 upon the underside to receive the top cross piece 17 of the frame and upon which the said blocks rest. It further contains a central hole therethrough to receive a bolt 27 which together with the nut 34 serves to secure the zincs 28 thereto and to electrically connect the same in the manner indicated. The front and rear sides of the block are provided with a shouldered recess 29 to receive a shouldered lug 30 on the zinc to form a firm and rigid connection between the two and to prevent them from turning. Washers 31 may be employed intermediate the bolt head, nut and the zincs, as shown, and a binding nut 33 is attached to outer end of bolt 27 to engage the connecting wire 10 before mentioned, and which is provided with a suitable rubber covering and taken up through the hole 9 in cover 6 for attachment to adjoining battery or circuit wire as case may require.

From the foregoing it will be seen that a device is provided which not only supports the copper plates but also supports the zincs and that both elements are carried together as if but one, and are made attachable and detachable by a pair of nuts. It will also be noted that the zincs and blocks are thus braced by the upturned portions 21 of the rods and are otherwise secured in a manner which will prevent the said zincs from being deflected out of position by the drawing of the wire 10 tight or in fact by any other cause such as is liable to arise in use.

It will be obvious that a single plate of a size equal to, or different from that of the two plates combined may be used instead of a pair of plates as shown, and accordingly the size of the frame may be varied to accommodate the change in plate if required.

Having thus described my invention what I claim and desire to secure by Letters Patent is:—

1. An electrode supporting frame for a battery, comprising channeled side and cross pieces to engage and overlap the four edges of an electrode, a pair of supporting rods secured to the upper portion of the said frame above the cross pieces, and means for the attachment of said rods to a battery cover.

2. An electrode supporting frame for a battery, comprising channeled sheet metal cross pieces to engage and overlap the top and bottom edges of an electrode, channeled sheet metal side pieces to engage and overlap the side edges of an electrode and connected with the cross pieces and extended above the top cross piece, and a suspending rod secured to each of said extended side pieces.

3. An electrode supporting frame for a battery, comprising a frame formed of sheet metal to engage the four edges of a negative plate and having the edges of the frame turned over upon the sides of the plate to hold the same in place, and L shaped rods secured to the upper part of the frame for supporting the same from a cover.

4. In a battery of the class described, the combination with a negative plate electrode, of a sheet metal channel frame for inclosing the edges thereof, an insulating block supported upon the top portion of the frame, rods secured to the upper portions of said frame with means for attachment to a cover and having their lower portions deflected inward across the top of the frame and against the block, and positive plate electrodes secured to the sides of said block on the opposite sides of the frame.

5. In a battery of the class described, the combination with a negative electrode, of a supporting frame for engaging the edges of the said element, an insulating block secured to the top edge of the frame, means to brace the upper portion of the block, zinc electrodes secured to the sides of the block and on opposite sides of the negative electrodes with means for electrically connecting the two zincs.

6. In a battery of the class described, the combination with a negative electrode, of a supporting frame for engaging the edges of the electrode, an insulating block secured to the top of the said frame, suspending rods secured to the said frame with the lower portions disposed inwardly and upwardly upon the said insulating block to brace the same, positive electrodes secured to the opposite sides of the said block and spaced from the negative electrode with means for electrically connecting the two positive electrodes.

Signed at Waterbury, in the county of New Haven, and State of Connecticut this 1st day of June A. D., 1908.

CHARLES B. SCHOENMEHL.

Witnesses:
C. M. NEWMAN,
RUTH RAYMOND.